3,383,387
2,3,5,6-TETRAHYDROXYPIPERAZINE-1,4-
DISULPHONIC ACID
James Andrew Gibson, Prestwick, and James Brown Parker, Kilwinning, Scotland, assignors to Imperial Chemical Industries Limited, London, England, a corporation of Great Britain
No Drawing. Filed Mar. 30, 1966, Ser. No. 538,562
Claims priority, application Great Britain, Apr. 21, 1965, 16,879/65
10 Claims. (Cl. 260—268)

ABSTRACT OF THE DISCLOSURE

There is provided new piperazine derivatives of 2,3,5,6-tetrahydroxypiperazine-1,4-disulphonic acid which may be used as explosive, sensitisers for explosives or energy-providing ingredients for explosives. There is also provided a process for the production of such compounds comprising reacting glyoxal with sulphamate in an inorganic basic solution.

---

This invention relates to a new piperazine derivative 2,3,5,6 - tetrahydroxypiperazine - 1,4-disulphonic acid and derivatives prepared therefrom, and to the preparation of these compounds. This new compound is conveniently prepared and isolated in the form of its salts.

In accordance with the process of the invention the new piperazine derivative is prepared by reacting glyoxal with a sulphamate in basic solution, the reaction being

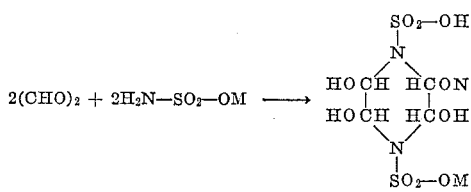

where M is a singly charged cation.

The reaction may conveniently be carried out in an aqueous medium from which the product is readily isolated in salt form by filtration. The aqueous medium may conveniently contain hydroxide, carbonate or bicarbonate of an alkali metal. The reaction is preferably carried out at elevated temperature; a temperature in the range 50 to 70° C. is convenient. The product readily crystallises on cooling the solution.

The glyoxal may conveniently be employed in the form of its monohydrate. The compound of the reaction is extremely reactive and is consequently a valuable intermediate for the preparation of many useful derivatives. For example, the nitration of the compound with a mixture of 100% nitric acid and acetic anhydride gives either a diacetyl-tetranitrated derivative or a tetra-acetyl-dinitro derivative, depending on the reaction conditions, especially reaction temperature. In these derivatives the four hydroxy groups are esterified, and the two sulphonic acid residues are replaced by nitro groups. The tetranitrated derivative has properties which show that it would be a useful energetic constituent of explosive compositions.

The invention is further illustrated by the following examples in which all parts and percentages are by weight.

EXAMPLE 1

A mixture of 97 parts of sulphamic acid and 84 parts of sodium bicarbonate was dissolved in 100 parts of water. 76 parts of glyoxal monohydrate were added to the solution and additional sodium bicarbonate (about 0.5 parts) was also added to neutralise acidic impurities in the glyoxal solution and to bring the pH to 7–8, and the mixture was heated to 55–60° C. After cooling the resultant solution and allowing it to stand at 0° C. for 16 hours, 40 parts (23% of theory) of 2,3,5,6-tetrahydroxy-1,4-disulphonic acid (di-sodium salt) formed as a white solid product and were filtered off. The solid was washed with ice-cold water (2×10 parts) and ice-cold ethanol (3×20 parts). The solid, which was dried under vacuum over phosphorus pentoxide, was found to melt (partially) at 127–129° C. Elemental analysis showed that the product contained C, 13.5%; H, 2.8%; N, 7.6%; Na, 12.9%; S, 17.3%. 2,3,5,6-Tetrahydroxy-1,4-disulphonic acid (di-sodium salt), $C_4H_8N_2Na_2O_{10}S_2$, requires C, 13.6%; H, 2.3%; N, 7.9%; Na, 13.0%; S, 18.1%. The molecular weight was found to be 300 (on the basis of 3 ions present in solution) compared to a theoretical value of 354.

The infra-red spectrum of the solid dispersed in a potassium bromide disc showed strong absorptions attributable to the hydroxyl group at 2.8 and 2.9$\mu$, and to the sulphonic group at 8.3, 8.6, 9.4, 9.6 and 15.6$\mu$. In addition there were other strong absorptions at 7.9, 9.1, 9.8, 10.2, 10.9 and 14.0$\mu$, and weaker absorptions at 6.1, 6.9, 17.2, 20.0, 20.8 and 24.4$\mu$.

An S-benzyl thiouronium derivative of the product was prepared and was found to melt with decomposition at 107° C. and to contain C, 37.5%; H, 5.1%; N, 12.9%; S, 19.8%. Di(S-benzyl thiouronium)2,3,5,6-tetrahydroxypiperazine-1,4-disulphonate, $C_{20}H_{30}N_6O_{10}S_4$, theoretically requires C. 37.4%; H, 4.7%; N, 13.1%; S, 19.9%.

Passage of an aqueous solution of the di-sodium salt through an acid ion-exchange column gave a solution which was titrated against 0.1 N NaOH and the equivalent weight of the salt was found to be 184 compared to a theoretical value of 177.

EXAMPLE 2

The preparation as described in Example 1 was repeated except that 40 parts of sodium hydroxide were used instead of sodium bicarbonate. 40 parts of white solid product were obtained on cooling and it was similar in melting point, infrared spectrum and analysis to the product of Example 1.

EXAMPLE 3

The di-potassium salt of 2,3,5,6-tetrahydroxypiperazine-1,4-disulphonic acid was prepared by repeating the procedure described in Example 1, except that 56 parts of potassium hydroxide were used instead of sodium bicarbonate. 35 parts (18% of theory) of white solid product were obtained. This solid melted with decomposition at 154° C. and its infra-red spectrum was very similar to that of the product obtained in Example 1. Elemental analysis showed that it contained C, 11.5%; H, 2.1%; K, 19.9%; N, 7.5%; S, 16.0%. 2,3,5,6-Tetrahydroxypiperazine - 1,4 - disulphonic acid (di - potassium salt), $C_4H_8K_2N_2O_{10}S_2$, theoretically requires C, 12.4%; H, 2.1%; K, 20.2%; N, 7.3%; S, 16.6%.

EXAMPLE 4

The di-potassium salt of 2,3,5,6-tetrahydroxypiperazine-1,4-disulphonic acid was prepared by repeating the procedure described in Example 1, except that 100 parts of potassium bicarbonate were used instead of sodium bicarbonate. 40 parts (21% of theory) of white solid product were obtained which had properties identical to those of the di-potassium salt described in Example 3.

EXAMPLE 5

The di-lithium salt of 2,3,5,6-tetrahydroxypiperazine-1,4-disulphonic acid was prepared by repeating the procedure described in Example 1, except that 24 parts of lithium hydroxide were used instead of sodium bicarbonate.

50 parts of white solid product were obtained. This solid melted with decomposition at 105–7° C. and its infra-red spectrum was very similar to that of the product obtained in Example 1. Elemental analysis showed that it contained C, 14.4%; H, 3.5%; Li, 4.0%; N, 7.4%; S, 14.4%. 2,3,5,6-tetrahydroxypiperazine - 1,4 - disulphonic acid (di-lithium salt), $C_4H_8Li_2N_2O_{10}S_2$, theoretically requires C, 14.9%; H, 2.5%; Li, 4.3%; N, 8.7%; S, 19.9%.

EXAMPLE 6

12 parts of 100% nitric acid were added dropwise to a stirred suspension of 1 part of di-sodium 2,3,5,6-tetrahydroxypiperazine-1,4-disulphonate in 3.2 parts of acetic anhydride at such a rate that the temperature was maintained between −10° and +5° C. The reaction mixture was stirred at −10° C. for one hour and then poured on to 30 parts crushed ice. The resultant precipitate was filtered off, washed quickly with ice-cold water, dried and recrystallised from acetonitrile to give 0.4 parts (34% of theory) of diacetoxy-dinitrato-1,4-dinitropiperazine as a white solid which melted at 170° C. Elemental analysis showed that it contained C, 23.4%; H, 2.6%; N, 19.4%; S, nil%. Diacetoxy - dinitrato - 1,4 - dinitropiperazine, $C_8H_{10}N_6O_{14}$, requires C, 23.2%; H, 2.4%; N, 20.3%.

The structure of the product of this reaction was deduced from its physical properties. The infra-red spectrum showed strong absorptions at 5.6µ due to acetate carbonyl, at 5.9µ due to covalent nitrate asymmetric stretching, at 6.2µ due to nitramine asymmetric stretching, at 7.5µ due to covalent nitrate symmetric stretching and at 7.75µ due to nitramine symmetric stretching. In addition there were other strong absorptions at 8.4, 9.8, 10.1, 10.6 and 12.2µ, and weaker absorptions at 3.3, 9.1, 11.3, 12.9 and 15.5µ. The proton magnetic resonance spectrum at 60 megacycles/sec. of the compound in acetonitrile solution, using tetramethylsilane as internal reference, showed single bands at 7.70 and 2.52ε in the approximate ratio 6:4. These chemical shifts and the ratio of intensities are consistent with those expected for the hydrogen nuclei of the acetate groups and piperazine ring of a molecule with a high degree of symmetry, such as 2,5-diacetoxy-3,6-dinitrato-1,4-dinitropiperazine. The presence of nitramine groups in this compound was also inferred from the ready replacement of two only of the four nitro groups by refluxing with acetic anhydride to give 2,3,5,6-tetra-acetoxy-1,4-dinitropiperazine identical to the product of Example 7.

When a ½ kg. mild steel hammer was dropped from a height of 60 cm. on to a thin layer of the solid product on a mild steel anvil, the product detonated, but there was no detonation when the height was 40 cm. A 0.1 g. sample placed in a round-bottomed glass-tube open to the atmosphere and heated at a rate of 5° C. per minute, ignited at 150° C.

EXAMPLE 7

3 parts of 100% nitric acid were added dropwise to a stirred suspension of 1 part of di-sodium 2,3,5,6-tetrahydroxy-piperazine-1,4-disulphonate in 3.2 parts of acetic anhydride at 30° C. The reaction mixture was stirred for 2 hours and then poured onto ice. The solid which precipitated was filtered off, washed with ice-cold water, dried and recrystallised from ethanol to give 0.8 parts (69% of theory) of 2,3,5,6-tetra-acetoxy-1,4-dinitropiperazine as a white solid which melted with decomposition at 267–8° C.

Elemental analysis showed that it contained C, 35.7%; H, 3.7%; N, 13.2%. 2,3,5,6-tetra-acetoxy-1,4-dinitropiperazine, $C_{12}H_{16}N_4O_{12}$, requires C, 35.3%; H, 3.9%; N, 13.7%. A determination of the molecular weight of the compound by the ebullioscopic method in acetone gave a value of 441, compared to the theoretical value of 408.

The structure of the product of this example was deduced from its physical properties. The infra-red spectrum showed strong absorptions at 5.6 and 5.65µ due to acetate carbonyl asymmetric stretching, at 6.3µ due to nitramine asymmetric stretching and at 7.8µ due to nitramine symmetric stretching. In addition there were other strong absorptions at 3.3, 7.3, 7.6, 8.2, 8.4, 9.5, 9.8 and 10.7µ, and medium absorptions at 8.9, 10.1, 11.0, 11.4, 12.1, 13.9, 16.3 and 16.6µ. The proton magnetic resonance spectrum at 60 megacycles/sec. of the compound in acetonitrile solution, using tetramethylsilane as internal reference, showed single bands at 7.70 and 2.76ε in the approximate ratio 12:4. This ratio was confirmed in a similar spectrum of the compound in trifluoroacetic acid solution. These chemical shifts and the ratio of intensities are consistent with those expected for the hydrogen nuclei of the acetate groups and piperazine ring of the symmetrical molecule 2,3,5,6-tetra-acetoxy-1,4-dinitropiperazine.

When a ½ kg. mild steel hammer was dropped from a height of 200 cm. on to a thin layer of the solid product on a mild steel anvil no detonation occurred. A 0.1 g. sample, placed in a round-bottomed glass-tube open to the atmosphere and heated at a rate of 5° C. per minute, did not ignite or detonate below 260° C.

What we claim is:

1. A compound selected from the group consisting of 2,3,5,6-tetrahydroxypiperazine - 1,4 - disulphonic acid and the alkali metal and S-benzyl thiouronium salts thereof.

2. A compound selected from the group consisting of di-lithium, di-sodium or dipotassium salt of 2,3,5,6-tetrahydroxypiperazine-1,4-disulphonic acid.

3. 2,5-diacetoxy-3,6-dinitrato-1,4-dinitropiperazine.

4. 2,3,5,6-tetra-acetoxy-1,4-dinitropiperazine.

5. A process for the preparation of a derivative of 2,3,5,6-tetrahydroxypiperazine-1,4-disulphonic acid derivative wherein glyoxal is reacted with sulphamate in a basic aqueous solution containing an alkali metal action.

6. A process as claimed in claim 5 wherein the aqueous medium contains hydroxide, carbonate or bicarbonate of an alkali metal.

7. A process as claimed in claim 5 wherein the reaction is carried out at elevated temperature.

8. A process as claimed in claim 5 wherein the glyoxal is employed in the form of its monohydrate.

9. A process for the preparation of a 1,4-dinitropiperazine derivative wherein 2,3,5,6-tetrahydroxypiperazine-1,4-disulphonate of an alkali metal is reacted with a nitrating agent comprising nitric acid and acetic acid.

10. A process as claimed in claim 9 wherein the product is an acetate of 2,3,5,6-tetrahydroxy-1,4-dinitropiperazine and wherein the reaction is carried out at up to 30° C.

References Cited

Robson et al. J. Amer. Chem. Soc., vol. 77 (1955), pages 2453–57.

HENRY R. JILES, *Primary Examiner.*